Oct. 19, 1943.  E. A. ZETTERQUIST ET AL  2,331,880
BOLT COOLING APPARATUS
Filed Oct. 23, 1941  2 Sheets-Sheet 1
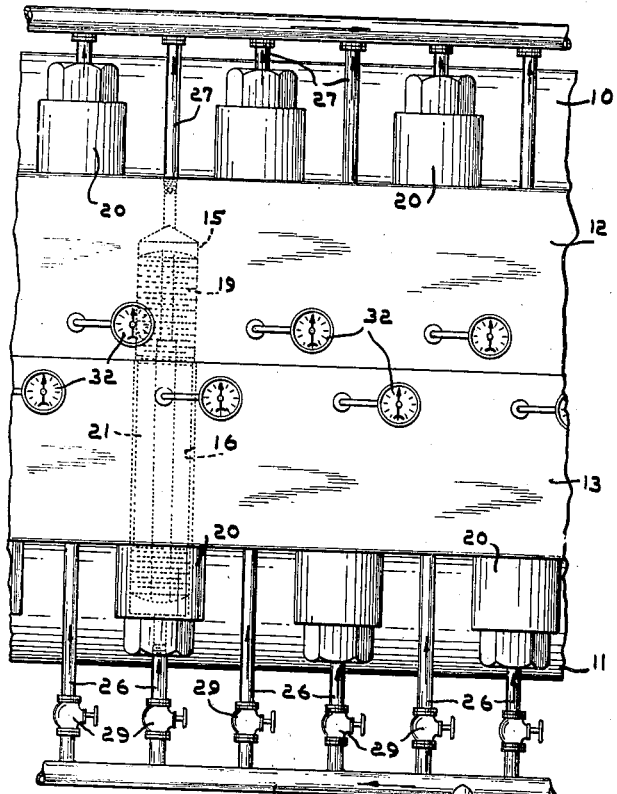
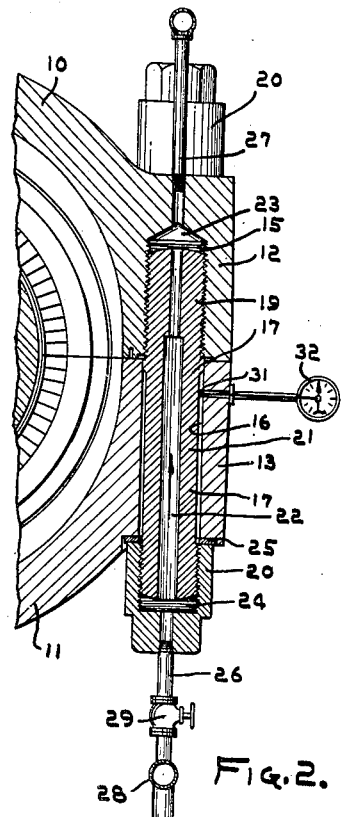
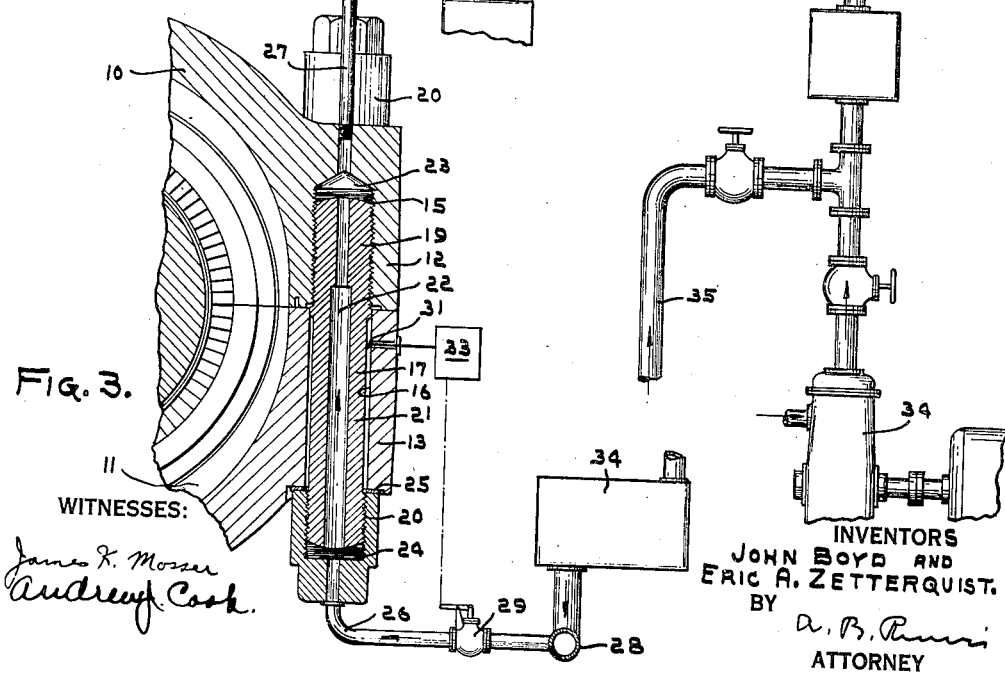
FIG. 1.
FIG. 2.
FIG. 3.
WITNESSES:
James F. Mosser
Andrew Cook
INVENTORS
JOHN BOYD AND
ERIC A. ZETTERQUIST.
BY
ATTORNEY Oct. 19, 1943.  E. A. ZETTERQUIST ET AL  2,331,880
BOLT COOLING APPARATUS
Filed Oct. 23, 1941  2 Sheets-Sheet 2

INVENTORS
JOHN BOYD AND
ERIC A. ZETTERQUIST,
BY
ATTORNEY

Patented Oct. 19, 1943

2,331,880

UNITED STATES PATENT OFFICE 2,331,880

BOLT COOLING APPARATUS

Eric A. Zetterquist, Drexel Hill, and John Boyd, Wilkinsburg, Pa., assignors to Westinghouse Electric & Manufacturing Company, East Pittsburgh, Pa., a corporation of Pennsylvania Application October 23, 1941, Serial No. 416,178

7 Claims. (Cl. 189—36)

The invention relates to elastic fluid turbine cylinder bolting and it has for an object to provide bolt cooling means capable of adjustment in order to avoid wide fluctuation in bolt and flange temperatures in normal operation.

A further object of the invention is to provide a cooling system for the bolts of a turbine cylinder wherein each bolt is provided with a cooling fluid supply conduit and such supply conduits are each provided with an adjusting valve so that a pressure-tight fit may be maintained.

A further object of the invention is to control the temperature of turbine cylinder bolts and flanges by means of a suitable medium caused to flow between the bolt shanks and the walls of registering bolt openings formed in mating cylinder flanges.

These and other objects are effected by the invention as will be apparent from the following description and claims taken in accordance with the accompanying drawings, forming a part of this application, in which:

Fig. 1 is a side elevational view of a turbine with the improved bolt cooling means supplied thereto;

Fig. 2 is a detail sectional view of one of the bolts and its associated cooling means;

Fig. 3 is a view similar to Fig. 2 but showing an automatic controlling arrangement;

Figure 4:
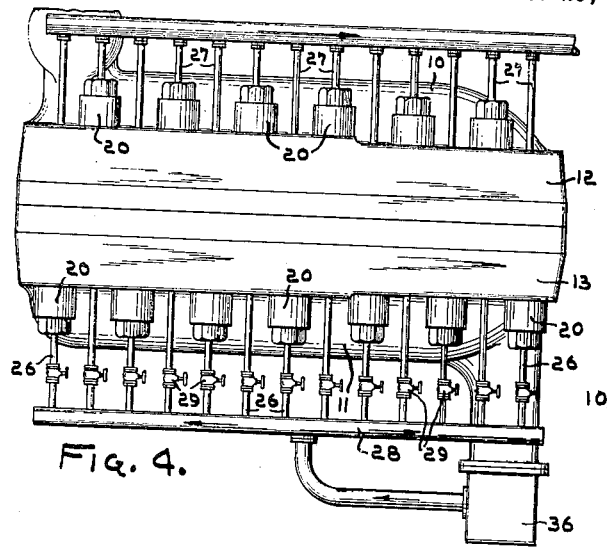
Fig. 4 is a view similar to Fig. 1 but showing a modified cooling arrangement.

A serious obstacle to the use of higher operating temperatures in power plants and the like is the difficulty of maintaining bolted joints pressure-tight. This is due largely to creep and relaxation which occur in materials at high temperature. For example, a high grade bolt material originally tightened to an initial stress of 40,000 lbs. per sq. in. will show a remanent stress of only 4,000 lbs. per sq. in. if tested in relaxation for 1,000 hours at 1,000° F. A joint at this temperature would, therefore, require frequent tightening of the bolts to prevent leakage and consequent service interruption. By reducing the temperature of the joint, the bolting may be made lighter or the length of the joint life extended. With proper cooling, the problem of tightening the bolts initially is lessened, as the initial stress may be very much less than if cooling is not used.

Accordingly, therefore, we not only provide for cooling of the bolting, but for cooling thereof in such a way that the temperature of each bolt is controlled by adjusting the quantity of cooling medium flowing thereto, whereby pressure on the joint may be regulated by adjusting the setting of the temperature of any or all of the bolts, the adjustment being made so that a predetermined maximum temperature is provided for each bolt irrespective of its environment. Further, should a leak develop at any point, pressure tightness may be restored by increasing the flow of cooling medium to the bolt or bolts thereof.

In the drawings, there is shown a turbine cylinder including upper and lower halves 10 and 11 having mating flanges 12 and 13. The flanges are provided with registering aligned openings 15 and 16 for the bolts 17 serving to maintain the flanges in pressure-tight engagement.

The studs or bolts may be of any suitable type, they having terminal portions 19 and 20 and a shank 21, the terminal portions 19 and 20 compressively engaging the flanges in order that the shanks may act in tension to hold the flanges in pressure-tight engagement.

As shown in Figs. 2 and 3, each bolt is of the stud type and has a central bore 22 having one end communicating with the chamber 23 provided by the opening 15 and the other end communicating with a chamber 24 provided by the cap form of compression member or nut 20. With the threaded end of the stud screwed into the opening 15 and the shank 21 extending through the opening 16, the cap nut is tightened, a washer 25 preferably being arranged between the latter and the adjacent flange.

Inlet and outlet conduits 26 and 27 communicate with the chambers 23 and 24, and the inlet conduits 26 are connected in parallel to a supply header 28 furnished with cooling medium from any suitable source. The branch conduits 26 are provided with adjusting valves 29 by means of which the quantity of cooling medium supplied to each bolt may be varied to suit requirements.

Each of the branch conduit valves 29 may be adjusted manually or automatically to suit the thermal conditions at each bolt location so as to limit the bolt temperature to a predetermined value. Where the valve is manually adjusted, as shown in Figs. 1 and 2, each bolt may have associated therewith a thermo-couple 31 provided with an indicator 32 in accordance with which the operator adjusts the associated valve 29.

If the valves 29 are to be automatically adjusted, then as diagrammatically shown in Fig. 3, the thermo-couple 31 controls the operation of any suitable relay or intervening mechanism, shown generally at 33, the latter operating to adjust the associated valve.

Any suitable medium may be used for bolt temperature reduction. In Figs. 1 to 3, inclusive, the supply manifold is furnished with air from any suitable source, for example, the compressor 34 and preferably also by means of the station or plant compressor line 35.

In Fig. 4, the manifold 28 is shown as being connected to the turbine exhaust 36. With this arrangement, steam is desuperheated incident to passage through the turbine with the result that its temperature is lower than that of steam supplied thereto and it may be used satisfactorily for cooling the bolts. Steam exhausting from the bolts may be disposed of in any suitable way, for example, through the gland or leak-off connections, to the deaerator, or to a low-pressure heater.

Figure 5:
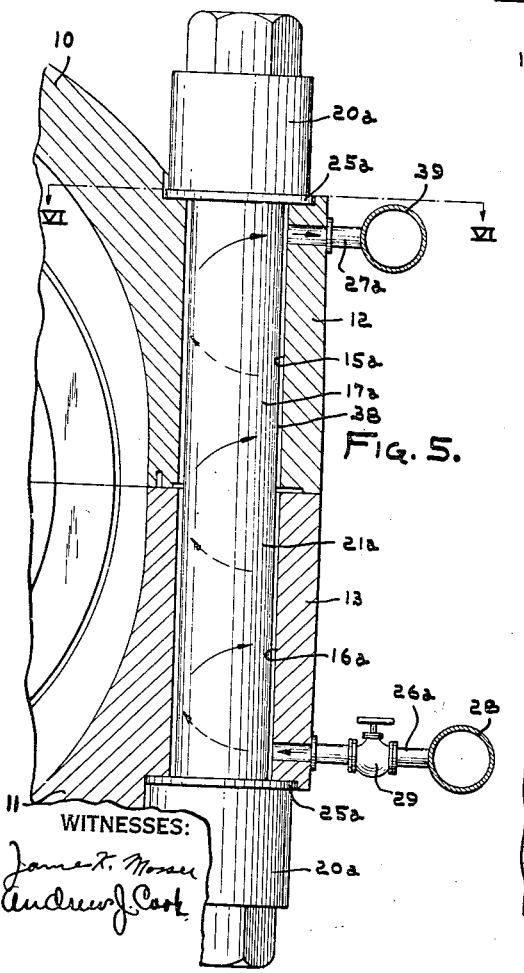
Fig. 5 shows an arrangement effective to cool both the bolt and the flanges.

As creep or relaxation in either the bolt, the flange, or the nut may be equally important in impairing the effectiveness of the joint, the present invention contemplates reduction in temperature of the entire assembly. To this end, in Figs. 5 and 6, the bolts 17a have the shanks 21a extending through the aligned openings 15a and 16a, as before, and nuts 20a are carried by opposite ends of the bolts, washers 25a being interposed between the nuts and the flanges. The aligned openings 15a and 16a are larger than the bolt shanks so that, with the bolts in position, each shank defines a space 38 of annular section extending for the full thickness of the mating flanges, the nuts 20a and washers 25a serving to cover the ends thereof. As shown, branch conduits 26a connected to the supply header 28 have their discharge ends connected to the lower flange 13 so as to communicate with the lower ends of the spaces 38, each conduit 26a having an adjusting valve 29 capable of either manual or automatic adjustment as already described.

An exhaust header 39 is connected by branch conduits 27a to the upper ends of the spaces 38. Therefore, if a valve 29 is opened, cooling medium will flow through the associated branch conduit 26a to the lower end of the space 38, upwardly through the latter, and exhaust through the associated branch conduit 27a, the fluid serving to absorb heat both from the bolts and the flanges.

Figure 6:
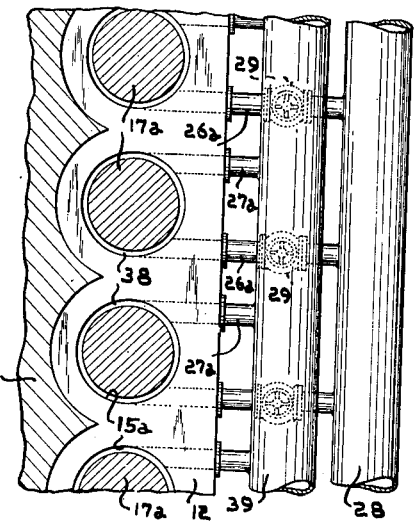
Fig. 6 is a sectional view taken along the lines VI—VI of Fig. 5.
Figure 7:
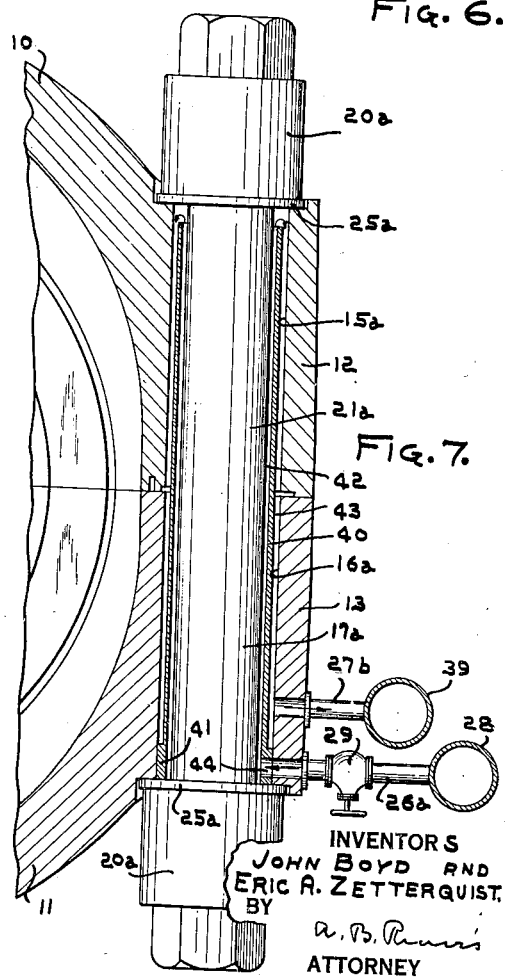
Fig. 7 shows a modified form of the cooling arrangement shown in Fig. 5.

In Fig. 7, there is shown a modified arrangement of the apparatus employed in Fig. 6. Instead of having the exhaust branch conduits 27a connected to the upper flange 12, as in Fig. 6, the exhaust conduits 27b are connected to the lower flange 13, and a baffle 40 is arranged in the space between the bolt shank 21a and the walls of the openings 15a and 16a. As shown, each tubular baffle 40 has a lower collar or rib portion 41 formed to fit the opening 16a to assure spacing of the baffle portion 40 from the walls of the aligned openings; and, as the baffle has a bore larger than the bolt shank 21a, it will be apparent that, with proper location of the bolts, the shank of each bolt will be spaced inwardly from the interior of its baffle. Thus, each baffle defines, with respect to its bolt shank, a passage 42 of annular section and, with respect to the interior walls of the aligned openings, a passage 43 of annular section. The baffle is formed to provide for communication of the passages or spaces 42 and 43 at the end remote from the collar 41, it preferably being shorter than the bolt shank for this purpose.

The branch supply conduits 26a are connected to the lower ends or passages 42, the collar or rib portion 41 having an opening 44 providing therefor and the branch exhaust conduits 27b are connected to the lower flange slightly above or adjacent to the points of connection of the supply branch conduits 26a and communicate with the spaces or passages 43. If a valve 29 is opened, the cooling fluid will be supplied to the lower end of the space or passage 42 and will pass upwardly about the bolt shank 21 to cool the bolt; and then the cooling fluid or medium reverses and passes downwardly through the outer passage 43 to exert a cooling effect on the walls of the aligned flange bolt openings.

From the foregoing, it will be apparent that, by separately controlling the cooling medium supplied to the bolts, pressure tightness may be maintained under varying conditions. Not only is the required initial bolt stress less, but should a leak develop, the bolt or bolts at the region thereof may have the supply of cooling medium increased in order to reduce the leak or to restore pressure tightness. Cooling of both the bolt and the flange assures of maximum effectiveness of the joint and serves to minimize the danger of producing large increases in bolt stress due to temperature difference between the flange and the bolt. Furthermore, by utilizing the space between a bolt and flange opening walls, complication of the bolt structure and piping is avoided and the bolt strength is preserved. With a hollow bolt, cooling is limited by the size of bore permitted with the retention of a given bolt strength. This limitation does not apply where the annular space about the bolt shank is used as a part of the cooling fluid passage.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in appended claims.

What is claimed is:

1. In an elastic-fluid turbine, a cylinder having mating flanges provided with aligned bolt openings, bolts in the openings and serving to maintain the flanges in fluid-tight engagement, said aligned openings being of larger diameter than the bolt shanks to provide spaces of annular section, and means providing for the flow of cooling medium along said spaces.

2. In an elastic-fluid turbine, a cylinder having mating flanges provided with aligned bolt openings; bolts in the openings and serving to maintain the flanges in fluid-tight engagement; said aligned openings being of larger diameter than the bolt shanks to provide spaces of annular section; and means providing for the flow of cooling medium along said spaces; the last-named means including supply conduits connected to the respective spaces and adjustable valves in the conduits.

3. The combination as claimed in claim 4 with means providing for adjustment of each supply conduit valve in accordance with the temperature of the associated bolt.

4. In an elastic-fluid turbine, a cylinder having mating flanges provided with aligned bolt openings, bolts in the openings and having portions compressively engaging the flanges so that the shanks thereof are effective in tension to hold the flanges in fluid-tight engagement, each pair of aligned openings being larger than the shank of its cooperating bolt to provide a chamber of annular section whose ends are closed by the compressively-engaged portions, and means providing for the flow of cooling medium along each of the chambers.

5. In an elastic-fluid turbine, a cylinder having mating flanges provided with aligned bolt openings, bolts in the openings and having portions compressively engaging the flanges so that the shanks thereof are effective in tension to hold the flanges in fluid-tight engagement, each pair of aligned openings being larger than the shank of its cooperating bolt to provide a chamber of annular section whose ends are closed by the compressively-engaged portions, and means providing for flow of cooling medium along each of the chambers and including inlet and outlet openings for the latter formed in the flanges.

6. The combination as claimed in claim 5 wherein the inlet and outlet openings formed in the flanges are located adjacent to the compressively-engaged bolt and flange portions.

7. In an elastic-fluid turbine, a cylinder having mating flanges provided with aligned bolt openings, bolts in the openings and having portions compressively engaging the flanges so that the shanks thereof are effective in tension to hold the flanges in fluid-tight engagement, each pair of aligned openings being larger than the shank of its cooperating bolt to provide a chamber of annular section whose ends are closed by the compressively-engaged portions, a tubular baffle in each chamber and dividing the latter into inner and outer portions each of annular section and providing for communication of the inner and outer portions adjacent to one end of the chamber, and means providing for flow of cooling medium in series through the portions of each chamber.

ERIC A. ZETTERQUIST.
JOHN BOYD.

CERTIFICATE OF CORRECTION.

Patent No. 2,331,880.　　　　　　　　　　　　　　October 19, 1943.

ERIC A. ZETTERQUIST, ET AL.

It is hereby certified that error appears in the printed specification of the above numbered patent requiring correction as follows: Page 2, second column, line 68, for "claim 4" read --claim 2--; and that the said Letters Patent should be read with this correction therein that the same may conform to the record of the case in the Patent Office.

Signed and sealed this 11th day of January, A. D. 1944.

Henry Van Arsdale,
　　　　　　　　　　　　　　　　　　　Acting Commissioner of Patents.
(Seal)